United States Patent [19]

Scott

[11] Patent Number: 5,046,251

[45] Date of Patent: Sep. 10, 1991

[54] THERMOPLASTIC-FABRIC SEAR-CUTTING HANDTOOL

[76] Inventor: Pamela C. Scott, 4521 Vista De La Patria, Del Mar, Calif. 92014

[21] Appl. No.: 539,883

[22] Filed: Jun. 18, 1990

[51] Int. Cl.[5] .......... B23F 3/00

[52] U.S. Cl. .......... 30/140; 30/254

[58] Field of Search .......... 30/140, 254; 219/229, 219/235, 236, 241

[56] References Cited

U.S. PATENT DOCUMENTS 2,866,068 12/1958 Bernstein et al. .......... 30/140

4,198,957 4/1980 Cage et al. .......... 30/140 X

*Primary Examiner*—Douglas D. Watts

[57] ABSTRACT

A low-cost hand-portable light-weight tool ideally suited for seamstress or upholster in domestic or commercial work, employing an electrical/heating-element of substantially known type of construction, into at least one blade member; whereby three species of the invention are set forth including variants thereof: a.) a scissor like embodiment, whereby the essential cutting and searing function is achieved under normal scissoring action by virtue of the oppositely closing blade's vertical shearing action relative to the opposed planar surface of the substantially thermoplastic fabric material. a species performing particularly effectively upon such fabrics having a proponderance of natural fibers in the weave, as well as ultra-sheer synthetic fabrics; b.) a fixed V-mouthed configuration similar to an opened scissor, therefore essentially relying upon a transversely moving manual thrust penetration into the fabric edge, generally more suitable for those heavier fabrics having a higher-percentage of thermoplastic-fibers in the weave; c.) a mono-bladed basic embodiment of the invention, whereby a handle portion includes a heating-tip having a fairly sharp blade edge which is directly applied anywhere upon the planar surface of the fabric, including a flat backing panel serving as a provisional working surface during the manual drawing procedure-;—all three species serving to simultaneously cut and minutely sear those severed fibers so as to negate occurance of fraying threads, and hence resulting in an exceptionally clean 'finished edge', ultimately saving the labor and expense involved in otherwise providing conventionally sewn seam construction.

11 Claims, 1 Drawing Sheet

FIG.-8 A-B
10
11
11'
12
12'
13
13'
13"
14
15
16
16"
17
18
19
20
21
22
23
24
25
26
27
28
31
32
33
34
35
36
37
38
40
40'
41
41'
X
6
B.
A.

THERMOPLASTIC-FABRIC SEAR-CUTTING HANDTOOL

II.) BACKGROUND OF THE INVENTION

This invention relates to the manual cutting and searing of fabrics woven substantially of synthetic thermoplastic-fiber thread such as may be generally characterized by polyester or other resin based thread filament such as rayon, nylon, acrylic, dacron, kevlar TM, etc., hereinafter simply refered to as the "fabric"; which is usually found combined with a natural stabilizing filiment such as cotton or wool.

More specifically, this invention pertains to convenient apparatus preferably devised in the form of a handtool such as would characterize a hot-blade or hot-scissor implement which may be employed to attain a more finished edge particularly free from tendancy to become threadbare; —such as would be defined as having thready strands eventually extending out from along an otherwise cleanly cut fabric edge achieved through use of an ordinary razor-knife or sharp scissor implement.

Heretofore, a seamstress or upholster person would usually employ conventional scissors in cutting out their fabric pattern, then necessarily have to resort to use of an open flame or other improvised means in effort to fuse away the raw cut end fibers which immediately tend to fray unattractively. This fusing of the fibers is refered to herein as a searing process, and actually involves the melting together of the individual resinous-strands so as to achieve a practically permanent integrity from fraying at the edge.

Accordingly, remotely related art of note ranges from U.S. Pat's. such as early No. 2,972,669 (filed 10/1957) dealing with the notion of a substantially conventional vertically moving bandsaw-blade (wire) which is heated locally at the work, so as to eliminate the necessity of sawteeth; and was said to cauterize (i.e. -sear) the exposed ends of plastic fabrics.

Next, U.S. Pat. No. 3,486,957 (filed 5/1966) dealing with a method of 'pinking' a selvedged fabric edge by transversley oscilliating a heated wire arranged to cut perpendicularly to the fabric plane. Additionally, U.S. Pat. Nos. 4,683,791 (filed 1/1984) and 4,601,224 (filed 10/1984) deal with the cutting of urethane-foam blocks into custom sculptured 3-D shapes of various sorts; —the idea being to easily cut through the resinous-foam (soft or rigid) via a suitable electrically resistance-heated wire, which locally only, melts the foam in a resulting precision-cut manner.

More notable, is U.S. Pat. No. 3,483,778 (filed 12/1969) which deals with a lable production machine having a feeder-roll capable of sequentially timed advancing of fabric lables in cooperation with lowering of a heated cutting-blade relative to a table mounted stationary blade; whereby the lable fabric feeds transversly to the direction of the blade cut.

Still more relevant invention-art is notable in U.S. Pat. No. 4,653,362 (filed 5/1985), wherein an elaborate reciprocating hot-blade system is set forth in the form of a computer-controlled production work-table; whereby a stack of thermoplastic fabrics may be volume cut to a particular pattern simultaneously. In this invention-art, the means of cutting the fabric is still via a necessarily sharp reciprocating blade leading-edge, which is employed to cut out non-resinous fabrics as well. The object of the invention being to provide a readily heatable blade body when resin-based fabrics are being cut, so as to eliminate the problem of airborne fibers and fiberous-dust, which is apparently generated in considerable amounts when stacks of plush-piled or fleecy fabrics such as velour or velvet are being handled.

Additionally, U.S. Pat. No. 4,161,898 (filed 3/1978) sets forth a rotary-blade (no teeth) set into a special housing having a resistance-heated electric-element set therein, so as to radiantly heat the cutting-edge; —the purpose being, to more readily volume slit plastic roll-stock material.

With the affore described invention art revealed, it should be noted that the present invention to now be set forth is under development for production as the Hot-Scizzor TM by the Searssor Mfg./Mkt Co of SanDiego-Calif., under the guidance of Inventech-R&D Co. of the same city.

III.) SUMMARY OF THE INVENTION

With various examples of related invention art having been discussed above, it is now my intention to show how my new configuration is able to provide improved utility for the individual engaged in sewing proceedures. Accordingly, the features which I feel are especially novel and advantageous to the cutting and seaming of thermoplastic-fabric (hereinafter referred to as the "fabric"), are as follows:

A.) An object of this invention is to provide a hand-portable scissor like handtool article having a substantially centrally located pivot joint enabling the provisional thumb handle and opposing finger handle portions to be manually operated in a conventional open condition (whereby the blades are advanced into the fabric edge), and in an alternate substantially closed condition (whereby the fabric has been severed via the blade action); whereas the closing blades may actually overlap in one variant of the species, while an alternate variant embodiment may have the blades actually abut in the manner of a blade and adjoining anvil like blade member; either version achieving a fabric severing action substantially via a sear-cutting action.

B.) Another object of this invention is to set forth a sear-cutting handtool article, wherein either the upper or the lower blade (or provisional anvil like blade member), or both upper and lower blades, may be electrically heated in the well known resistance-element manner as is commonplace in electric soldering tools for example.

C.) Another object of this invention is to set forth a variant embodiment preferably configured substantially in the manner of an open scissor, except that no pivot-axis is provided for manipulation of the opposed blade like entities; the blades being formed essentially fixed to a predetermined V-mouth opening arrangement whereby fabric is simply fed into the V-mouth as result of a forward manual thrusting action of the hand, and whereupon the heated upper blade portion of the V-mouth acts to simply sever the fabric by virtue of it's heated blade sear-cutting action. Note that while the handtool could be used inverted whereby the hot blade would become situated at the bottom position, it is found that fabric laying for longer than an instant upon the hot blade by force of gravity, can result in excessive melting of the thermoplastic material.

D.) Another object of this invention is to set forth a variant embodiment preferably configured in ultimate simplicity as a single heated blade provided with a suitably heat insulating handle portion, the aggregation therefore being applied rather in a drawing manner over the fabric, including a substantially rigid and relatively heat-resistant material such as pressed fiberboard for example, facilitating suitable backup over which the fabric is laid while the tool is thus easily guided over any pattern lines drawn upon the upper side of the resting fabric; one advantage of this version of the invention being that a sear-cut may be made into the fabric anywhere with relative ease merely by applying the hot blade edge against the fabric in a linear or curving manner as may be required.

E.) Another object of this invention is to set forth a sear-cutting handtool article, wherein the upper blade is preferably heated, and the lower blade is made relatively sharper; hence the upper blade thus preferably acts to sear-cut the resin based thread-fibers, while the lower blade acts to otherwise simultaneously shear-cut those remaining non-synthetic thread fibers; thereby achieving a very clean cutting action even when employed with fabrics having a relatively low proportion of meltable fibers in it's weave composite.

F.) Another object of this invention is to set forth a sear-cutting handtool having an electric-cord member with a standard end plug serving to allow the user a degree of mobility relative to a fixed 115 v.ac/line-current outlet-box; or, in an alternate variant embodiment, the said electric-cord would extend to a quick-charge/-receiver-housing unit which enables the handtool to be virtually cordless during use (being powered by a rechargable-battery housed within the handtool handle portion), albeit a relatively short period of time subject to usual recharging intervals necessary in high-wattage applications.

IV.) BRIEF DESCRIPTION OF THE DRAWINGS

The foregoing and still other objects of this invention will become fully apparent, along with various advantages and features of novelty residing in the present embodiments, from study of the following description of the variant configurations wherein indica of reference are shown to match related points in the text, as well as the Claims annexed hereto; and accordingly, a better understanding of the invention and the discovered uses is intended, by reference to the drawings, which are considered as primarily exemplary, and not to be therefore construed as restrictive in nature.

Figures 1, 2, 3, 4, 5, 6, 7:
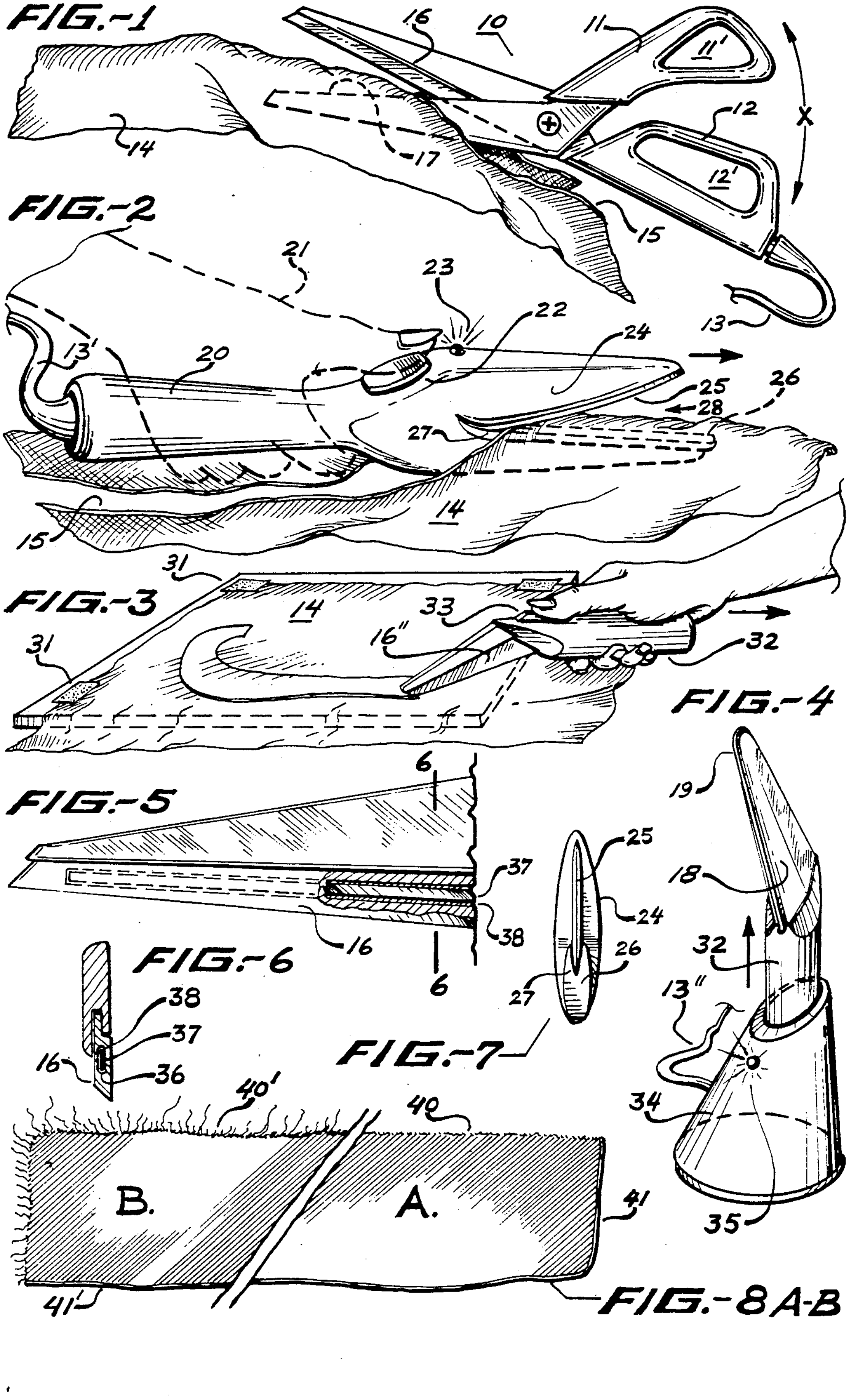
FIG. 1, is a left side pictorial elevation-view of the invention, demonstrating a normal attitude of usage; wherein the operator's hand is removed for purpose of clarity, and a portion of the lower blade member is shown via dotted phantom outline where it is cloaked by the exemplified fabric.
FIG. 2, is a right side pictorial elevation-view demonstrating an alternate generic variant of the invention; wherein the operator's hand is shown in dotted phantom outline for sake of clarity, as is the lower cloaked anvil-blade portion of the cutting mouth.
FIG. 3, is a left side pictorial view of another generic variant of the invention; wherein the cutting-platform is shown substantially via dotted phantom outline where it is being cloaked by the fabric.
FIG. 4, is a pictorial elevation-view representing the accessory base member associated with preceeding FIG. 3; wherein the actual circular-base portion is delineated partially via dotted phantom outline at its aftward region normally hidden from view in this position as it rests upon the unseen supporting surface.
FIG. 5, is a left side elevation-view of an exemplified searing blade, such as that depicted in FIG. 1; including a vertical reference cut 6—6.
FIG. 6, is a vertical cross-section view of the searing blade member such as is revealed in preceeding FIG. 5.
FIG. 7, is a detail frontal elevation-view showing only the forward V-mouth and attendant features therein according to the embodiment of FIG. 2.

FIG. 8, is a two-part A and B representation of an exemplified thermoplastic fabric swatch; wherein the upper-right side portion is typical of an edge as it appears freshly cut by a conventional pair of scissors, while the upper-left demonstrates how the same edge soon becomes distressed through normal handling. Accordingly, the lower-right edging shows the same fabric after it is freshly cut by means of this invention, while the lower-left edging reveals how the same edge does not become distressed later in usage.

IV.) DETAILED DESCRIPTION OF THE PREFERRED EMBODIMENTS

Initial reference is given to FIG. 1 wherein is shown the scissor like version of the invention 10 remiss of an operator's hand (the fingers of which would normally be inserted in the digital aperature 11' and thumb aperature 12') whereby the respective upper and lower handles 11 and 12 are shown in a normal opened position, although is to be understood that this variant embodiment may be actually used in the manner of a conventional pair of scissors, that is to say in a continuous opened and closed manner of action 'X'. Accordingly, this embodiment of the invention is actually capable of cutting natural non-synthetic fabrics such as cotton or wool even when the electric current linecord 13 is left unplugged. However, when cutting fabrics even partially composed of thermoplastic-thread in the weave, much more satisfactory results are to be obtained by simply plugging-in the linecord 13, whereupon after waiting a moment for preheating of the upper thermoblade to reach it's proper operating temperature, one will notice that cutting resistance is markedly reduced. In fact, when cutting those fabrics woven almost entirely of thermoplastic thread, one discovers that the scissors will still cut quite easily simply by thrusting the shears through the fabric edge while the mouth of the scissors is held about half way open, such as is depicted in FIG. 1. Note there also that the portion of the thermoplastic fabric 14 having been already cut, is delineated with a particular cleanly seared edge 15, which is so remarkable about this special handtool, in that it serves to minutely fuse those thread ends impinging upon the heated blade portion 16, the lower blade 17 functioning as a conventional sharp cutting edge.

Study of FIG. 2 reveals a variant of this invention having a single fixed handle 20 suitably formed for a person's hand (which is indicated here at 21 via phantom outline), and may include an on/off-switch 22 along with an LED-lamp 23 to indicate an 'on' condition. Again, the electric line-current two-conductor linecord 13' provides the user manual-control over the heat of the thermo-blade 16', of which the necessity of actuating may be soon mastered simply by feeling the resistance required to thrust the fixed cutting V-mouth 28 through the sample thermoplastic fabric 14'. Note here again, how the heated upper blade member 25 is preferably recessed down into the lower anvil blade 26 (preferably unheated so as to enable the thermoplastic fabric to safely drape thereover without fear of indiscriminate heat damage), thereby achieving a more consistantly clean cutting edge. Further study of this recessed blade arrangement is found in FIG. 7, wherein it can be seen how the anvil blade 26 includes an abbreviated slot entity 27 enabling the aftward portion of the thermo blade 25 to be assembled therein. Note also in FIG. 2 how the arched blade edge 25 serves to approach the narrowed recess of the cutting mouth in a nearly tangent manner, which configuration serves to enhance the ease by which the sear-cutting action takes place.

Next, reference to FIG. 3 discloses another variant embodiment of this invention, including a heat-resistant working platform surface 30 not needed with the two preceeding examples of this invention. Note here, that adhesive-tape 31 is preferably used to conveniently locate the thermoplastic fabric 14" in place upon the panel 30. In this situation the special handtool features only a single thermo-blade 16" in conjunction with an extensile handle portion 32, again replete with a manually actuated thumb-switch 33 which acts to close the electrical-circuit, and resultantly heat the blade member much in the manner familar to electrical resistance-heating or induction-heating commonly employed in the construction of ordinary electrical soldering-gun apparatus. Additionally, the embodiment shown here features the advantage of a cordless system, whereby the handle 32 also contains a rechargable-battery (such as a nicad-battery), and is readily recharged via the special safety-standup receiver-base 34 which simply plugs into any line-current receptacle-outlet via electrical linecord 13". The obvious advantage of the cordless feature being freedom to approach the cutting task from any direction without becoming entangled in the dangling electrical-cord. Note in FIG. 3 also, how this version of the invention may be directly applied at any location upon the thermoplastic fabric in order to cutout a pattern-design lightly drawn upon the fabric, or even placed beneath the more translucent fabrics; obviating need to approach the work from the perimeter edge of the fabric. In FIG. 4, the sear-cutting handtool is shown being recharged via LED-lamp indicator 35, being achieved simply by virtue of a twin electrical-contact arrangement, which is common practice known to various types of rechargable handtools; however of particular value here in that it poises the possibly hot sear-cutting blade such as exemplified thermo-blade type 16" or 19.

Reference to FIG'S. 5 and 6 reveal the preferred thermo-blade construction. For example, a thin copper or stainless-steel wire 19 may be tautly wrapped around the groove like perimeter recess of the special heat-resistant dielectric Pyrex blade support body 18, the opposite ends of the thermowire (tantamount to a thermo-blade) being routed into the tool handle for connection to a low-volt/hi-amp electrical current source of substantially conventional circuitry design. In contrast, FIG'S. 5 and 6 set forth the type of thermo-blade wherein a hollow-center 36 serves to contain both the electrical heating-element 37 and heat compatible electrical insulating material 38. The blade is compromised of two blade parts connected together. One said blade part contains the heating elements.

Finally, study of FIG. 8 shows the attractive improvement this invention makes via sear-cutting process, wherein the fabric swatch shows a conventionally shear-cut edge 40 on fresh portion 'A'; which is later shown to become very distressed looking along the same edge 40', after subsequent handling. In stark contrast, the sear-cut edge 41 looks the same in fresh cut portion 'A' as it does in the subsequently much used swatch portion 'B'; a demonstratably remarkable difference. This improvement therefore enables the user to virtually eliminate often laboriously turned under seaming such as is normally required during the construction of a garment for example; and simple hair-ribbons may be cut via sear-cutting method, likewise never to become frayed looking. It is found that by employing the sear-cutting proceedure entirely during the pattern cutting and sewing together of a simple ladies dress, that labor time can be reduced about 50% overall, when one considers the time ordinarily required to attend to all of the many tuck-under folds necessary to eliminate unsightly raw-cut edges. The sear-cut edge may in fact in many instances eliminate the need for a sewn edge-seam altogether, particularly when a heavier weight thermoplastic fabric is being employed; and even sear-cut button-holes can sulfice in many instances where shear-stress is not a factor.

Accordingly, it is understood that the utility of the foregoing adaptations of this invention is not dependent upon any prevailing invention patent necessarily; and while the present invention has been well described hereinbefore by way of several preferred embodiments, -it is to be relaized that various changes, alterations, rearrangements, and obvious modifications may be resorted to by those skilled in the art to which it relates, without substantially departing from the implied spirit and scope of the invention. Therefore, the invention has been disclosed by way of example and not by thus imposed limitation.

I claim the following inventive features as proprietary in origin:

1. A improved handtool for convenient sear-cutting of substantially thermoplastic type woven fabrics, whereby the fabric may remain stationary while the handtool is moved relatively into the edge of the fabric, thereby melting the fiberous strands apart in a severing action while simultaneously searing the resulting fiberous ends so as to thus unite the exposed local fibers in a momentary melting action which eliminates the otherwise tendancy for such fibers to subsequently fray along the cut edge; comprising:

a.) a line-current powering means;

b.) a handle means for insulatively grasping and manually guiding of the tool; said blade comprised of two parts, one said part containing a fiber cutting straight blade means;

c.) an electric resistance heating element situated in such proxmity to said cutting blade part member as to efficiently conduct heat into the blade over a range of 400 F.-1600 F./degrees.

2. A synthetic-fabric cutting handtool according to claim 1, wherein the said line-current powering means is a two-conductor electric cord directly connected to a substantially conventional circuit breaking thermosensor device capable of maintaining the blade temperature at the desired working level of heat.

3. An electric powering system according to claim 2, wherein the powering means includes a provisional receiver mounting member housing a suitable voltage stepdown transformer capable of recharging a battery contained within the removable handtool body member; thereby facilitating use of the handtool in a cordless modality of enhanced convenience and mobility.

4. A synthetic-fabric cutting handtool according to claim 1, wherein the said handle means may be adapted in the form of a single member suitable for comfortable holding in either hand, whereby the said blade member is arranged distally therefrom so as to enable the device to be drawn over the fabric in in a resulting cutting manner.

5. A handtool for thermoplastic fabrics according to claim 1, wherein the said handle means and said blade means are made substantially in the configuration of a pair of scissors, including an approximately centrally located pivot axis whereby one handle includes a thumb hole the other handle includes a hole for the opposing fingers of user's hand; thereby enabling the respective blades to be open or closed in conventional overlap manner, or in the alternative abuted in the manner of an upper blade member and a lower anvil like member.

6. A handtool for thermoplastic fabrics according to claim 1, wherein the said handle means allows suitable grasping of the tool by one's hand, while the blade is formed with a fixed V-mouth angle opening which is easily thrust into the fabric edge.

7. A handtool for thermoplastic fabrics according to claim 1, wherein the said electric resistance heating element means is a relatively thin element of metal imbeded in a dielectric insulator extending substantially the length of the upper blade cutting edge or in close proximity thereto.

8. A handtool for thermoplastic fabrics according to claim 1, wherein the said line-current powering means is a conventional two-conductor electric cord extending into the handle portion formed continuously with the resultingly heated blade member, whereby the two leads feed electric current as a circuit to opposite ends of the said heating element.

9. A single bladed handtool according to claim 4, wherein the sear-cutting action is greatly enhanced by provision of a substantially solid planar working surface such as a panel of substantially rigid and relatively heat resistant material, facilitating suitable backup over which the fabric is laid while being drawn upon by the hot blade.

10. A handtool for thermoplastic fabrics according to claim 1, wherein the line-current powering means includes an electrical transformer capable of inductively reducing the voltage supplied to the heating-element to a safe anti-shock level, while current amperage is increased proportionally, thus maintaining equivalent wattage flow as to heat a blade edge directly at the exposed edge if desired without presense of anti-shock electrical insulation protection.

11. A scissor like sear-cutting handtool according to claim 5, wherein the said upper blade member is the heated blade and the lowe blade member presents a relatively sharp cutting edge; hence those thermoplastic fibers are severed and seared via the upper blade, while those natural fibers in the weave are simultaneously cut by the particularly sharp lower blade member.

* * * * *